UNITED STATES PATENT OFFICE.

FREDERICK PFANNER, OF PROVIDENCE, RHODE ISLAND.

IMPROVEMENT IN PREPARATION OF DYE-STUFF FROM SPENT MADDER.

Specification forming part of Letters Patent No. 4,192, dated September 13, 1845.

*To all whom it may concern:*

Be it known that I, FREDERICK PFANNER, of the city and county of Providence, in the State of Rhode Island and Providence Plantations, have invented a new and Improved Dye-Stuff, which I call "Carasene," for Dyeing Calicoes, of which, &c.

The nature of my invention consists in submitting spent madder—a substance which has been used in dyeing and thrown aside as useless—to the chemical action of water, sulphuric acid, and an alkali, whereby a new and superior dye-stuff is produced.

To enable others skilled in the art to make use of my invention, I will proceed to describe the process of making the same.

I take three pounds of spent madder, wash it; then I take five gallons of cold water, to which I add a quantity of sulphuric acid sufficient to raise its strength 1° by the hydrometer, into which I put the three pounds of washed spent madder, let it stand ten minutes, then drain off the water, which is replaced by five gallons more of water, to which is added eight ounces of soda dissolved in warm water, or any other alkali of sufficient strength and quantity to neutralize the action of the sulphuric acid. Let it stand fifteen minutes. The liquor is then filtered off and the remains dried in a warm room, free from the air, and when perfectly dry is pulverized. It is then ready for use. It is then used as madder is ordinarily used by calico-dyers.

The specification above has reference to three pounds of spent madder. For a greater or less quantity a corresponding quantity of the other materials must be used.

A specimen of the spent madder from which the carasene is made accompanies the specification in a packet marked "spent madder," and of the dye-stuff, after it is prepared, in another packet marked "carasene."

What I claim as my invention, and desire to secure by Letters Patent, is—

The method of making the dye-stuff or carasene from spent madder by the chemical action of water, sulphuric acid, and an alkali, as described above.

FREDERICK PFANNER.

Witnesses:
ARAD COLBURN,
AMOSA T. WESTCOTT.